Feb. 21, 1928. 1,659,859

O. E. COX

AUTOMATIC FLOAT VALVE

Filed Nov. 15, 1926

Inventor
Owen E. Cox
Ellis Spear Jr.
By Attorney

Patented Feb. 21, 1928.

1,659,859

UNITED STATES PATENT OFFICE.

OWEN E. COX, OF LOWELL, MASSACHUSETTS.

AUTOMATIC FLOAT VALVE.

Application filed November 15, 1926. Serial No. 148,338.

This invention relates to automatic float valves. For the purpose of this application I shall show and discuss my valve in connection with an automatic oil feed system for internal combustion engines, but it is to be understood that such treatment is purely illustrative and in no way limiting and that I may employ my valve in any place where an automatic valve is needed.

In an automatic oil feed system of the kind contemplated herein, new oil is automatically admitted to the crank case to replace the oil used by the engine, so that the oil level in the crank case will be maintained constant or practically constant at all times.

To accomplish this, a gravity tank for reserve oil is mounted on the chassis and through a float chamber equipped with an automatic valve admits reserve oil to the crank case in proportion to the amount of crank case oil used up by the engine.

Much difficulty, however, has been experienced with the automatic valve. Heretofore, such valve has been arranged to open with the pressure from the reserve tank, and inasmuch as the pressure is relatively considerable as compared with the effective action of the float on the valve, the valve cannot be held against its seat tightly enough to prevent the oil from leaking therepast and flowing into the crank case in greater amount than is needed to maintain the crank case level constant. To overcome this objection, it has been proposed to counterbalance the float itself sufficiently to overcome the pressure of the reserve oil against the valve. This expedient has not proved satisfactory, however, because the float when counterweighted, proportionately lost its efficiency as an operating lever to open the valve when the crank case oil level dropped. More than this, the construction of the valve itself has been such as to require the use of an elaborate system of levers and counterweights so that the valve did not operate with that degree of certainty which is required in an automatic system of this character.

To the end, therefore, of avoiding the disadvantages of prior practice and of providing a valve which will automatically, and in directly proportionate amount, replace the oil used by the engine, I have devised my present invention. According to it, my valve opens against rather than with the pressure from the reserve tank so that the tendency of this pressure is at all times to maintain the valve tightly against its seat, and thus prevent leakage. When the float in the float chamber drops, however, due to the corresponding lowering of the oil level in the crank case, the valve automatically opens to permit only so much reserve oil from the reserve tank to pass through the float chamber and into the crank case as is necessary to restore the oil in the crank case to its predetermined operating level and then automatically closes to prevent an over-supply of oil to the crank case. This action is continuous and automatic so that the oil level in the crank case is maintained at all times constant or practically constant. Structurally, my valve presents certain advantageous features to the end that it will be positive and reliable in action. In particular, my valve involves a simple and positive arrangement of levers in the nature of a compound lever for transmitting the movement of the float in directly proportionate degree to the valve.

The construction and operation of my device is described and illustrated in the accompanying specification and drawings, and the particular features of novelty are pointed out in the appended claims. In the drawings:

Figure 1:
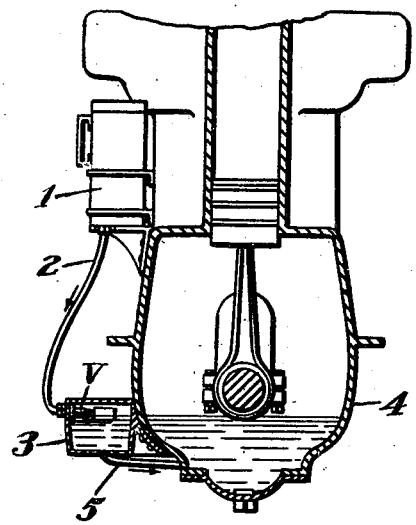
Fig. 1 is a general view of an automatic oil feed system of conventional type equipped with an automatic float valve in accordance with my invention.

In an automatic oil feed system of the class contemplated herein, the reserve oil is contained in a reservoir 1 and feeds by gravity through a pipe 2 into a float chamber 3 which is adjustably mounted on the chassis of the truck or other vehicle adjacent the crank case 4 and communicated therewith by means of pipe 5.

Figure 2:
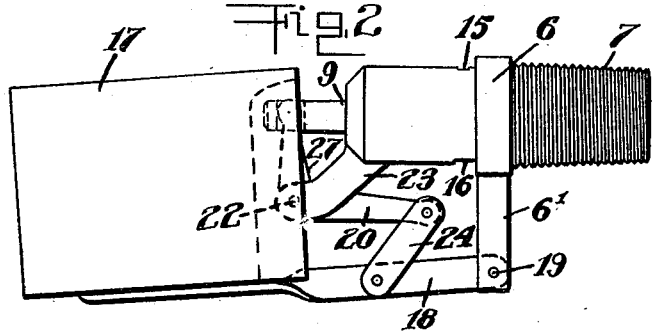
Fig. 2 is an elevation of the float valve, removed, the valve being in closed position.
Figure 3:
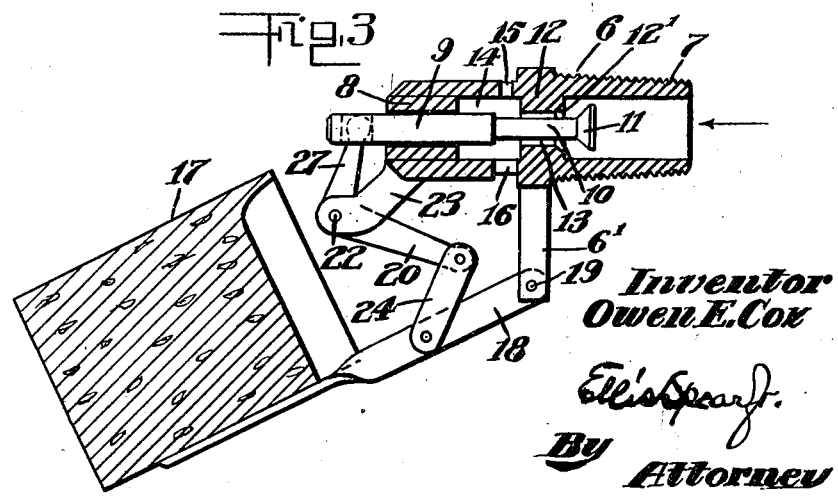
Fig. 3 is a longitudinal section thereof and showing the valve opened.

According to my invention, the float valve, indicated generally at V in Fig. 1 and detailed in Figs. 2 and 3, is so arranged within the float chamber 3 as to open against the pressure of the oil from the reservoir 1. The tendency of the valve is therefore always towards its closed position, that is to say, the pressure tends constantly to maintain the valve against its seat and thus prevent leakage therepast. The construction is such however that the valve instantly opens when the level of the crank case oil drops whereby to permit reserve oil from the reservoir 1 to flow therepast into the crank case in direct proportion to the amount used up by the engine, and instantly closes when the crank case level has been restored to prevent an over-supply of oil to the crank case.

This insures that the crank case oil will at all times be maintained at the level at which the engine operates with greatest efficiency, and avoids the dangers due to either over supply or under supply of oil in the crank case, since with my valve the crank case oil is augmented strictly in proportion to its depletion or in other words, with drop-by-drop exactness.

My valve is of the horizontally arranged sliding type, and includes a valve casing 6 which is mounted to project through one of the side walls of the float chamber and at its outer end is formed as an exteriorly threaded nipple 7 adapted to connect with the discharge end of the pipe 2 from the oil reservoir. At its opposite end, the valve casing is bushed at 8 to provide a guide for a horizontally sliding valve stem 9, which is reduced beyond said bushing, as indicated at 10 and terminates at its outer end in an inwardly beveled head 11. The valve casing, between its ends is formed with a vertical partition 12 which is axially pierced as at 13 and on its outer face is provided with an inwardly beveled seat 12' for the correspondingly beveled head 11 of the valve stem.

The pressure of the oil from the reserve tank 1 normally forces the valve against its seat 12'. When the valve is opened, however, as indicated in Fig. 3, the oil from the reserve tank passes through the opening 13 in the partition 12, which opening is of greater diameter than the reduced portion 10 of the valve stem 8 so as to permit passage of the oil therepast, and into the chamber 14 which is formed in the valve casing immediately behind the partition.

This chamber is vented as at 15 and is provided at its lower side with a discharge port 16 opening into the float chamber.

The valve is opened and closed according to the movement of a float 17 which is provided with an arm 18 pivoted at 19 to a hanger 6' depending from the valve casing 6.

The motion transmitting connections from the float to the valve may be of any desired type, but as here shown comprise a compound lever including a bell crank 20—27 pivoted at 22 to an arm 23 extending from the valve casing and linked at 24 to the arm 18 of the float.

This system of leverage is at once simple and positive in action and insures that the valve will be promptly and accurately responsive to float movements.

In operation, so long as the oil level in the float chamber and crank case are equal, the valve will be closed and will be held closed by the pressure of the reserve oil from tank 1. Upon a drop in the crank case oil level, however, the level of the oil in the float chamber and the float will be correspondingly lowered, and this movement of the float, through the motion transmitting connections from the float to the valve, will open the valve against the pressure of the reserve oil a distance proportionate to the drop of the float. As soon as the crank case oil is raised to its original level by the admission of the reserve oil, the float will operate to again close the valve.

This operation is continuous and automatic, and on account of the positive action of the motion transmitting connections between the float and the valve and the fact that the tendency of the reserve oil pressure is to maintain the valve seated, the valve is unusually sensitive and positive, permitting an automatic replenishment of crank case oil practically in drop-by-drop proportion to its depletion.

Various modifications in the construction and operation of my device may obviously be resorted to if within the limits of the appended claims.

What I therefore claim and desire to secure by Letters Patent is:

1. In an automatic oil feed of the class described, in combination, a crank case, a float chamber, and a reserve reservoir adapted to be placed in communication with the crank case through the float chamber, an automatic valve in said float chamber opening against the pressure of the reserve oil from the reserve tank and normally held to its seat by such pressure, and a float in said float chamber responsive to variations in the oil level of the crank case and a pivoted arm connected to said float, a link carried by said arm, and a bell crank lever pivoted to said casing and operatively connected to said link and to said valve.

2. In an automatic float valve, a float chamber, a float in said chamber, a valve casing provided with a partition presenting an outwardly faced valve seat and with a valve chamber having an outlet port opening therefrom into said float chamber, a valve stem slidable axially through said casing and having a valve head adapted to engage said seat, and a motion-transmitting connection between said float and stem including an arm connected to said float and pivoted to said valve casing, a link carried by said arm, and a bell crank lever pivoted to said casing and operatively connected to said link and to said valve stem.

In testimony whereof I affix my signature.

OWEN E. COX.